(12) United States Patent
Takahashi

(10) Patent No.: US 9,746,794 B1
(45) Date of Patent: Aug. 29, 2017

(54) OPTICAL SCANNING DEVICE AND IMAGE FORMING APPARATUS THEREWITH

(71) Applicant: KYOCERA Document Solutions Inc., Osaka (JP)

(72) Inventor: Hiroki Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/501,736

(22) PCT Filed: Nov. 10, 2015

(86) PCT No.: PCT/JP2015/081587
§ 371 (c)(1),
(2) Date: Feb. 3, 2017

(87) PCT Pub. No.: WO2016/084594
PCT Pub. Date: Jun. 2, 2016

(30) Foreign Application Priority Data

Nov. 26, 2014 (JP) .................................. 2014-238377

(51) Int. Cl.
*G03G 15/04* (2006.01)
*H04N 1/028* (2006.01)
(Continued)

(52) U.S. Cl.
CPC ..... *G03G 15/04072* (2013.01); *H04N 1/0283* (2013.01); *H04N 1/06* (2013.01); *H04N 1/29* (2013.01); *H04N 2201/0091* (2013.01)

(58) Field of Classification Search
CPC ................. G03G 15/011; G03G 15/04; G03G 15/04036; G03G 15/04072; G03G 15/80;
(Continued)

(56) References Cited

U.S. PATENT DOCUMENTS

| | | | |
|---|---|---|---|
| 2008/0084467 A1* | 4/2008 | Satou ....................... | B41J 2/473 347/132 |
| 2009/0323147 A1* | 12/2009 | Amada .................... | B41J 2/471 359/205.1 |
| 2012/0044316 A1* | 2/2012 | Amada .................... | B41J 2/473 347/232 |

FOREIGN PATENT DOCUMENTS

| | | |
|---|---|---|
| JP | 2006-227494 A | 8/2006 |
| JP | 2008-180873 A | 8/2008 |

(Continued)

OTHER PUBLICATIONS

International Search Report dated Jan. 19, 2016, issued by the Japanese Patent Office in corresponding application PCT/JP2015/081587.

(Continued)

*Primary Examiner* — Benjamin Schmitt
(74) *Attorney, Agent, or Firm* — Stein IP, LLC

(57) ABSTRACT

An optical scanning device is provided with a housing, a plurality of laser light sources, and a substrate. The laser light sources are attached to a side wall of the housing in a state wherein three terminals are protruding outward. The substrate is disposed to face an outer surface of the side wall of the housing. The laser light sources include: a first laser light source having a predetermined angle with respect to the substrate; and a second laser light source having a symmetrical angle to the angle of the first laser light source with respect to the substrate. In the first laser light source, only one of the three terminals is bent in the direction to be separated from other two terminals, and the second laser light source is disposed by inverting 180° a laser light source having a configuration same as that of the first laser light source.

6 Claims, 12 Drawing Sheets

(51) Int. Cl.
*H04N 1/06* (2006.01)
*H04N 1/29* (2006.01)

(58) Field of Classification Search
CPC ........... G03G 21/1652; G03G 21/1666; G03G 2215/0404; G03G 2221/1636; G03G 2221/166; B41J 2/442; B41J 2/45
USPC ........ 399/118, 177, 205, 220; 347/241, 242, 347/245, 256, 257, 263
See application file for complete search history.

(56) References Cited

FOREIGN PATENT DOCUMENTS

| | | |
|---|---|---|
| JP | 2010-256770 A | 11/2010 |
| JP | 2011-187448 A | 9/2011 |
| JP | 2013-222165 A | 10/2013 |

OTHER PUBLICATIONS

Written Opinion of the International Searching Authority dated Jan. 19, 2016, issued by the Japanese Patent Office in corresponding application PCT/JP2015/081587.

* cited by examiner

OPTICAL SCANNING DEVICE AND IMAGE FORMING APPARATUS THEREWITH

CROSS-REFERENCE TO RELATED APPLICATIONS

This application claims the benefit of International Application No. PCT/JP2015/081587 filed Nov. 10, 2015, in the International Patent Office, which claims priority to Japanese Application No. 2014-238377, filed Nov. 26, 2014, in the Japanese Property Office, the disclosures of which are incorporated herein by reference.

TECHNICAL FIELD

The present invention relates to an optical scanning device that scans with laser light to write and form an image and that is incorporated in an image forming apparatus such as a printer, a copier, or a facsimile machine, and relates also to an image forming apparatus provided with such an optical scanning device.

BACKGROUND ART

Conventional image forming apparatuses exploiting electrophotography such as copiers, printers, etc., incorporate an optical scanning device that scans and thereby irradiates the surface of a photosensitive drum which has been electrostatically charged uniformly by a charging device with laser light modulated based on entered image data. An electrostatic latent image formed by the optical scanning device is developed into a toner image by a developing device. Then, the toner image is transferred to a recording sheet or the like, and is then turned into a permanent image by a fixing device. In this way, an image forming process proceeds.

The optical scanning device includes a laser light source (LD) that emits laser light for writing an electrostatic latent image, an optical system for scanning, while reflecting the emitted laser light, in the axial direction (the main scanning direction) of the photosensitive drum, a housing for housing these, a light source circuit board fitted to the housing, etc. The optical scanning device writes an electrostatic latent image on the surface of the photosensitive drum with laser light with which the optical system scans the surface.

For example, Patent Document 1 discloses an optical scanning device that includes four laser light sources, an optical system for scanning with laser light, and four light source circuit boards for controlling the output of the laser light sources respectively. For another example, Patent Document 2 discloses an optical scanning device that includes four laser light sources, an optical system for scanning with laser light, and one light source circuit board for controlling the output of four laser light sources.

LIST OF CITATIONS

Patent Literature

Patent Document 1: Japanese Patent Application Publication No. 2006-227494
Patent Document 2: Japanese Patent Application Publication No. 2010-256770

SUMMARY OF THE INVENTION

Technical Problem

In an optical scanning device like the one described above, when a plurality of LDs having mutually different angles with respect to a circuit board are fitted to the housing and one circuit board, an attempt to fit the LDs with their terminals (leads) extending straight results in a narrow gap between oblong terminal insertion holes formed in the circuit board; this makes it difficult to form a copper layer (land) on the circuit board. Thus, it is necessary to widen the gap between the terminal insertion holes by previously having the terminals of the LDs subjected to forming (bending). Here, as the number of places subjected to forming increases, the likeliness of electrostatic breakdown, cracks, wire bonding breakage, etc., in the LDs increases. Thus, a reduction is sought in the number of places subjected to forming.

When the angles of two LDs with respect to a circuit board are in symmetry, using two types of LDs which have their terminals subjected to forming in different shapes increases the number of components, and also makes it necessary to sort these two types of LDs to fit them to places corresponding thereto respectively. This inconveniently complicates the manufacturing process.

Devised against the background discussed above, an object of the present invention is to provide an optical scanning device that can minimize the number of places where an LD terminal has to be subjected to forming, that allows easy formation of a copper layer on the circuit board, and that can achieve a reduced number of components and simplified assembly, and to provide an image forming apparatus incorporating such an optical scanning device.

Means for Solving the Problem

To achieve the above object, according to first aspect of the present invention, an optical scanning device includes a housing, a plurality of laser light sources, and a circuit board. The optical scanning device scans a scanned surface with laser light emitted from the laser light sources. The plurality of laser light sources are fitted to a side wall of the housing such that three terminals of the laser light sources protrude outward. The circuit board is arranged opposite an outer face of the side wall of the housing, and has formed therein insertion holes through which the terminals of the laser light sources are inserted. The laser light sources each include a first laser light source which has a predetermined angle with respect to the circuit board, and a second laser light source which has such an angle with respect to the circuit board as to be in symmetry with the first laser light source. The first laser light source has, of the three terminals thereof, only one terminal subjected to bending in a direction away from the other two terminals. The second laser light source is a laser light source having the same structure as the first laser light source but arranged rotated through 180° therefrom.

Advantageous Effects of the Invention

According to the first aspect of the present invention, it is possible to use the same component for both the first laser light source having a predetermined angle with respect to the circuit board and the second laser light source having such an angle with respect to the circuit board as to be in symmetry with the first laser light source. This helps reduce the number of components, and thus helps improve assembly efficiency. The first and second laser light sources each have, of the three terminals thereof, only one terminal subjected to bending in a direction away from the other two terminals. Thus, it is possible to suppress the likeliness of electrostatic breakdown, cracks, wire bonding breakage, etc., and also to secure a gap between terminal insertion holes required to form a copper layer.

BRIEF DESCRIPTION OF DRAWINGS

FIG. 12 is a sectional view showing a state where the laser light source 40a is pressed and fixed in a press-in portion 55 of a light source insertion hole 50a;

FIG. 15 is a perspective view showing a state where the laser light sources 40a is pressed and fixed in the press-in portion 55 of the light source insertion hole 50a;

DESCRIPTION OF EMBODIMENTS

Figure 1:
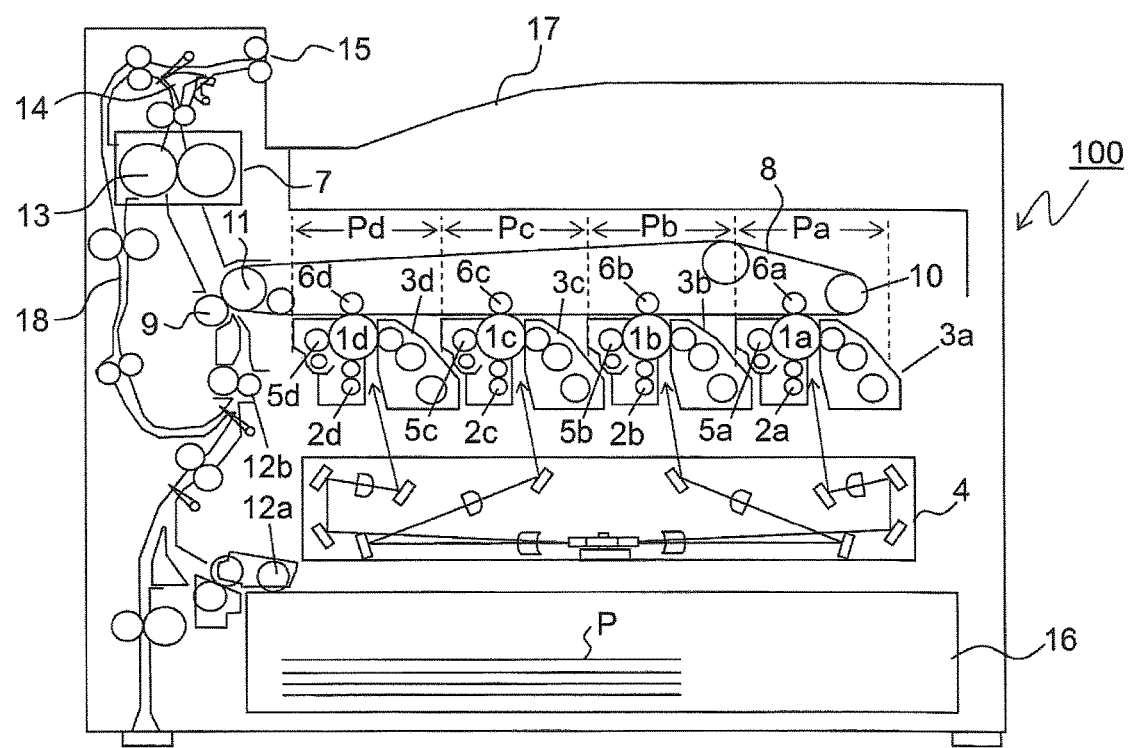
FIG. 1 is a schematic diagram showing an overall construction of a tandem-type color image forming apparatus 100 incorporating an optical scanning device 4 according to the present invention.

Hereinafter, embodiments of the present invention will be described with reference to the accompanying drawings. FIG. 1 is a schematic sectional view of an image forming apparatus 100 incorporating an optical scanning device 4 according to the present invention, here showing a tandem-type color image forming apparatus. Inside the main body of the image forming apparatus 100, four image forming portions Pa, Pb, Pc, and Pd are arranged in this order from the upstream side (the right side in FIG. 1) with respect to the transport direction. These image forming portions Pa to Pd are provided to correspond to images of four different colors (cyan, magenta, yellow, and black) respectively, and sequentially form cyan, magenta, yellow, and black images respectively, each through the processes of electrostatic charging, exposure to light, image development, and image transfer.

In these image forming portions Pa to Pd, there are respectively arranged photosensitive drums 1a, 1b, 1c and 1d that carry visible images (toner images) of the different colors. Moreover, an intermediate transfer belt 8 that rotates in the clockwise direction in FIG. 1 by being driven by a driving means (unillustrated) is arranged next to the image forming portions Pa to Pd. Toner images formed on these photosensitive drums 1a to 1d are sequentially transferred to the intermediate transfer belt 8 that moves while being in contact with the photosensitive drums 1a to 1d, and are then transferred all at once to a transfer sheet P by a secondary transfer roller 9. Then, the toner images are fixed to the transfer sheet P in a fixing portion 7, and the transfer sheet P is then discharged out of the apparatus main body. While the photosensitive drums 1a to 1d are rotated in the counter-clockwise direction in FIG. 1, an image forming process is performed with respect to each of them.

Transfer sheets P to which toner images are to be transferred are stored in a sheet cassette 16 in a lower part of the apparatus, and are transported via a sheet feeding roller 12a and a registration roller pair 12b to the secondary transfer roller 9. As the intermediate transfer belt 8, a dielectric resin sheet is used, which typically is, for example, a seamless belt having no seam.

Now, the image forming portions Pa to Pd will be described. Around and under the photosensitive drums 1a to 1d, which are rotatably arranged, there are arranged charging devices 2a, 2b, 2c, and 2d for electrostatically charging the photosensitive drums 1a to 1d, an optical scanning device 4 for exposing the photosensitive drums 1a to 1d to light based on image data, developing units 3a, 3b, 3c, and 3d for forming toner images on the photosensitive drums 1a to 1d, and cleaning portions 5a, 5b, 5c, and 5d for removing developer (toner) left unused on the photosensitive drums 1a to 1d.

When an instruction to start image formation is fed in by a user, the surfaces of the photosensitive drums 1a to 1d are first electrostatically charged uniformly by the charging devices 2a to 2d, and are then irradiated with laser light by the optical scanning device 4 so that electrostatic latent images based on the image signal are formed on the photosensitive drums 1a to 1d respectively. The developing units 3a to 3d are charged with predetermined amounts of toner of different colors, namely cyan, magenta, yellow, and black respectively, by a supplying device (unillustrated). The toner is fed from the developing units 3a to 3d onto the photosensitive drums 1a to 1d, and electrostatically attaches to them, thereby forming toner images based on the electrostatic latent images formed by exposure to light from the optical scanning device 4.

Then, an electric field is applied between primary transfer rollers 6a to 6d and the intermediate transfer belt 8 with a predetermined transfer voltage, and then, by the primary transfer rollers 6a to 6d, the cyan, magenta, yellow and black toner images on the photosensitive drums 1a to 1d are transferred to the intermediate transfer belt 8. These images of four colors are formed in a predetermined positional relationship prescribed to form a predetermined full-color image. Thereafter, in preparation for subsequent formation of new electrostatic latent images, toner left unused on the surfaces of the photosensitive drums 1a to 1d is removed by the cleaning portions 5a to 5d.

The intermediate transfer belt 8 is wound around a transport roller 10 on the upstream side and a driving roller 11 on the downstream side. As the driving roller 11 rotates by being driven by a driving motor (unillustrated), the intermediate transfer belt 8 rotates in the clockwise direction; meanwhile, a transport sheet P is transported from the registration roller pair 12b, with predetermined timing, to the secondary transfer roller 9 arranged next to the intermediate transfer belt 8 so that a full-color image formed on the intermediate transfer belt 8 is transferred to the transport sheet P. The transfer sheet P having the toner images transferred to it is transported to the fixing portion 7.

The transfer sheet P transported to the fixing portion 7 is then heated and pressed there by a fixing roller pair 13 so that the toner images are fixed to the surface of the transport sheet P to become a permanent image. The transfer sheet P having the full-color image fixed on it in the fixing portion 7 is distributed between different transport directions by a branching portion 14 which branches into a plurality of directions. When an image is formed only on one side of the transfer sheet P, the transfer sheet P is discharged, as it is, onto a discharge tray 17 by a discharge roller pair 15.

On the other hand, when images are formed on both sides of the transfer sheet P, a large part of the transfer sheet P having passed through the fixing portion 7 is momentarily discharged onto the discharge tray 17; then, the discharge roller pair 15 is rotated in the reverse direction so that the transfer sheet P is pulled back into the apparatus. The pulled-back transfer sheet P is then distributed into a reverse transport passage 18 by the branching portion 14; thus the transfer sheet P is, with the image side reversed, transported once again to the secondary transfer roller 9. Then, the next image formed on the intermediate transfer belt 8 is transferred by the secondary transfer roller 9 to the side of the transfer sheet P on which no image has yet been formed. The transfer sheet P is then transported to the fixing portion 7, where the toner image is fixed, and is then discharged onto the discharge tray 17.

Figure 2:
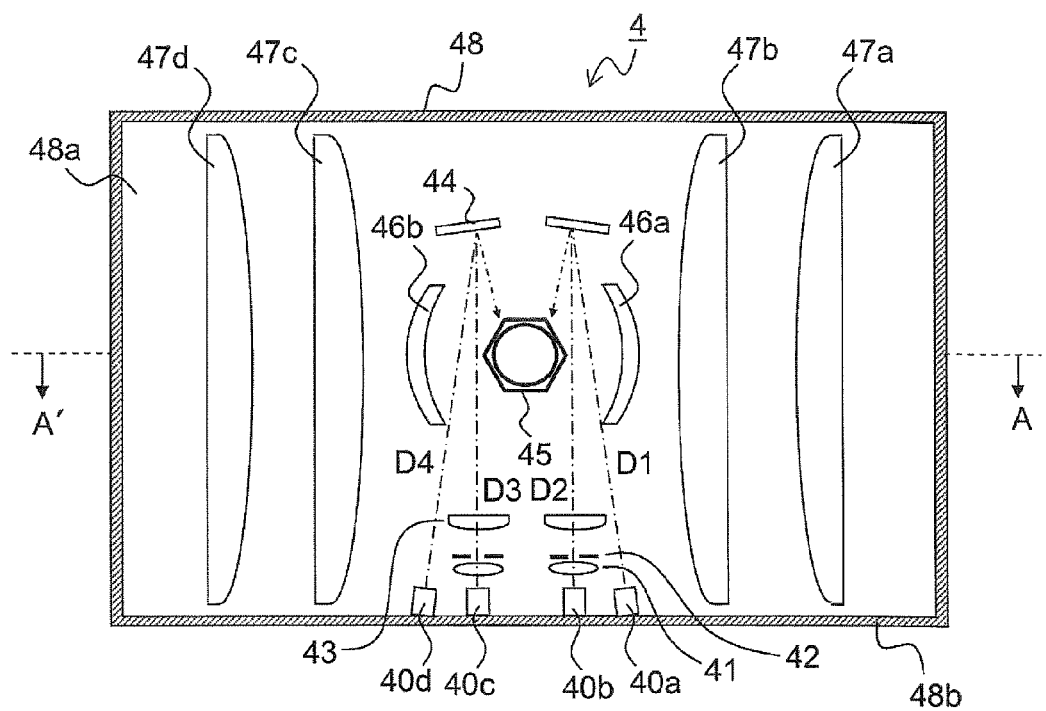
FIG. 2 is a plan view showing an internal structure of the optical scanning device 4 according to one embodiment of the present invention.
Figure 3:
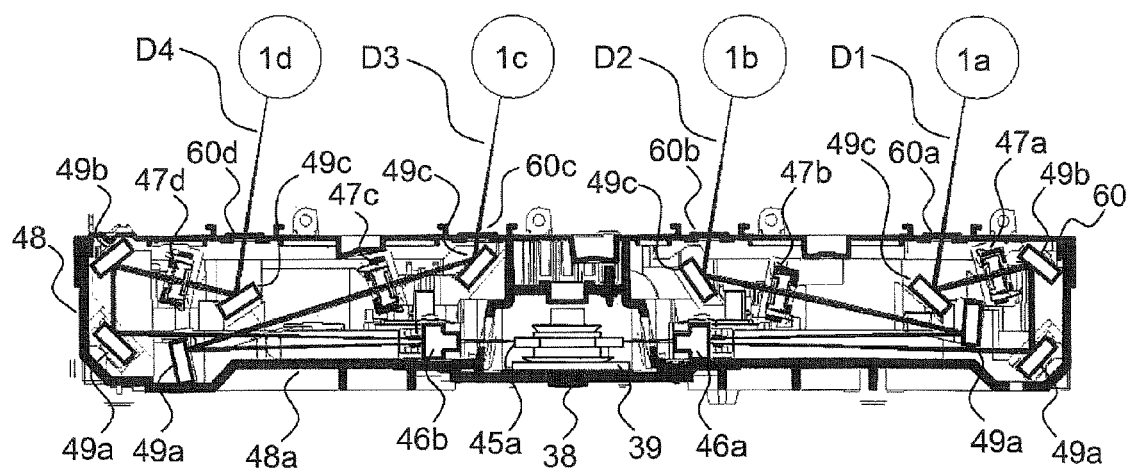
FIG. 3 is a side sectional view showing the internal structure of the optical scanning device 4.

FIG. 2 is a plan view showing an internal structure of the optical scanning device 4 according to one embodiment of the present invention; FIG. 3 is a side sectional view (as seen from the direction indicated by arrows A and A' in FIG. 2) showing the internal structure of the optical scanning device 4 according to the present embodiment. In FIG. 2, plane mirrors 49a to 49c are omitted from illustration. As shown in FIGS. 2 and 3, the optical scanning device 4 has a housing 48, and substantially in a central part of a bottom surface 48a of the housing 48, a polygon mirror 45 is arranged. In this embodiment, the polygon mirror 45 is formed as a rotary multiple-face mirror in the shape of a regular hexagon having, as its side faces, six deflection surfaces (reflection surfaces) 45a. The polygon mirror 45 is driven to rotate at a predetermined speed by a polygon motor 38. The polygon motor 38 is fixed to a motor supporting plate 39, and the motor supporting plate 39 is fixed to the bottom surface 48a.

On a side wall 48b of the housing 48 on its front side (on the bottom side in FIG. 2), there are arranged four laser light sources 40a to 40d. The laser light sources 40a to 40d comprise LDs (laser diodes), and emit laser light (beam light) D1 to D4 optically modulated based on an image signal.

Between the laser light sources 40a to 40d and the polygon mirror 45, there are arranged four collimator lenses 41 that are arranged so as to correspond to the laser light sources 40a to 40d respectively, apertures 42 that give the laser light beams D1 to D4 having passed through the collimator lenses 41 a predetermined beam width, four cylindrical lenses 43 through which, after having passed through the apertures 42, the laser light beams D1, D2, D3 and D4 pass respectively, and two turning mirrors 44 that direct the laser light beams D1 to D4 having passed through the cylindrical lenses 43 to the deflection surfaces 45a of the polygon mirror 45. In FIG. 2, only the collimator lenses 41, the apertures 42, and the cylindrical lenses 43 that correspond to the laser light sources 40b and 40c are illustrated, meaning that the collimator lenses 41, the apertures 42, and the cylindrical lenses 43 that correspond to the laser light sources 40a and 40d are omitted from illustration.

The collimator lenses 41 form the laser light beams D1 to D4 emitted from the laser light sources 40a to 40d into substantially parallel light beams; the cylindrical lenses 43 have a predetermined refractive power only in the sub-scanning direction (the up/down direction in FIG. 3). Inside the housing 48, a first scanning lens 46a is arranged opposite a first scanning lens 46b across the polygon mirror 45; second scanning lenses 47a and 47b are arranged opposite second scanning lenses 47c and 47d across the polygon mirror 45. The first scanning lenses 46a and 46b and the second scanning lenses 47a to 47d have fθ characteristics so as to focus the laser light beams D1 to D4 reflected and deflected by the polygon mirror 45 on the photosensitive drums 1a to 1d (see FIG. 1). In the optical paths of the laser light beams D1 to D4 from the polygon mirror 45 to the photosensitive drums 1a to 1d (see FIG. 1), the plane mirrors 49a to 49c are arranged.

Now, how the optical scanning device 4 configured as described above performs scanning with the laser light beams D1 and D2 will be described. First, the laser light beams D1 and D2 emitted from the laser light sources 40a and 40b are formed into substantially parallel light beams through the collimator lenses 41, and are then given a predetermined optical path width by the apertures 42. Then, the laser light beams D1 and D2 having been formed into substantially parallel light beams are incident on the cylindrical lenses 43. The laser light beams D1 and D2 having entered the cylindrical lenses 43 exit as they are, that is, as the parallel light beams in the main scanning section but after been converged in the sub-scanning direction, so as to be focused as linear images on the deflection surfaces 45a of the polygon mirror 45. Here, for easy separation between two optical paths of the laser light beams D1 and D2 deflected by the polygon mirror 45, these laser light beams D1 and D2 are configured to be incident on the deflection surfaces 45a at different angles in the sub-scanning direction.

The laser light beams D1 and D2 incident on the polygon mirror 45 are deflected by the polygon mirror 45 at a constant angular velocity, and are then deflected by the first scanning lens 46a at a constant velocity. The laser light beams D1 and D2 having passed through the first scanning lens 46a are bent a predetermined number of times by the plane mirrors 49a and 49b arranged in their respective optical paths; then, the laser light beams D1 and D2 are incident on the second scanning lenses 47a and 47b respectively to be deflected by the second scanning lenses 47a and 47b at a constant velocity. Then, the laser light beams D1 and D2 deflected at a constant velocity are bent by the last plane mirrors 49c arranged in their respective optical paths so as to be directed, through windows 60a and 60b formed in a top cover 60 that covers an opening of the housing 48, to the photosensitive drums 1a and 1b.

Likewise, the laser light beams D3 and D4 emitted from the laser light sources 40c and 40d are, after passing through the collimator lenses 41, the apertures 42, and the cylindrical lenses 43, deflected by the polygon mirror 45 at a constant angle, and are then deflected by the first scanning lens 46b at a constant velocity. Then, after being bent by the plane mirrors 49a and 49b, the light beams laser D3 and D4 are deflected by the second scanning lenses 47c and 47d respectively at a constant velocity. Then, the laser light beams D3 and D4 are bent by the last plane mirrors 49c so as to be directed, through windows 60c and 60d, to the photosensitive drums 1c to 1d.

Figure 4:
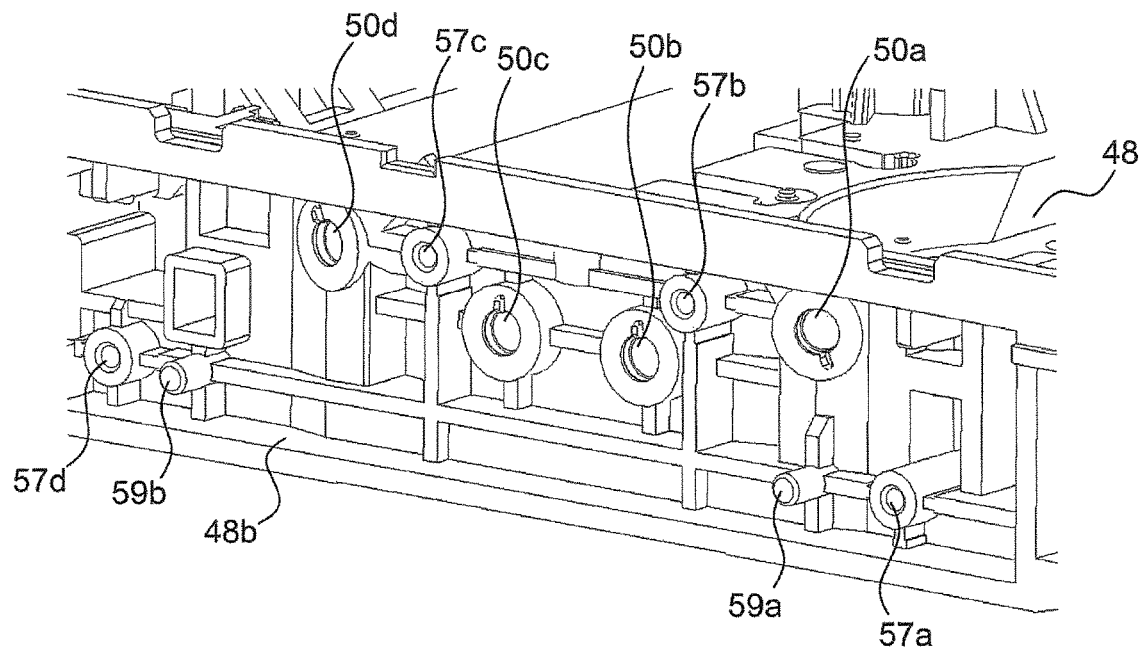
FIG. 4 is a perspective view of a side wall 48b of a housing 48, to which laser light sources 40a to 40d are fitted.

Now, the structure around the laser light sources 40a to 40d will be described in detail. FIG. 4 is a perspective view of the side wall 48b of the housing 48, to which the laser light sources 40a to 40d are fitted.

As shown in FIG. 4, in the side wall 48b of the housing 48, there are formed four light source insertion holes 50a to 50d in which the four laser light sources 40a to 40d are fitted respectively.

Moreover, in the side wall 48b, there are formed, each in a predetermined position, screw holes 57a to 57d into which screws (unillustrated) are threaded so as to fix a circuit board 70 (see FIG. 7) to the side wall 48b, and two positioning bosses 59a and 59b that protrude outward from the side wall 48b to determine the position of the circuit board 70.

Figure 5:
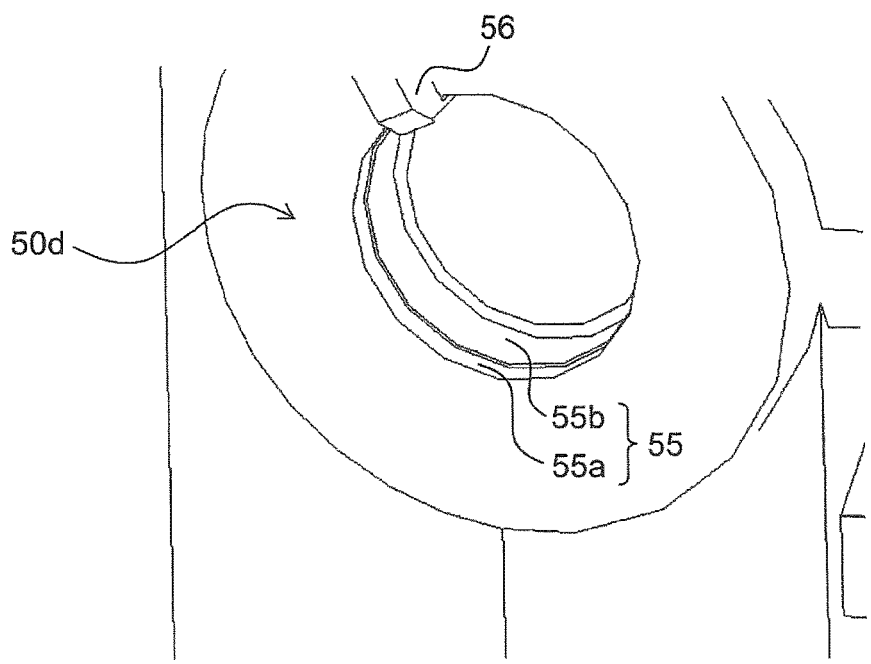
FIG. 5 is a perspective view of a light source insertion hole 50d formed in the side wall 48b.
Figure 6:
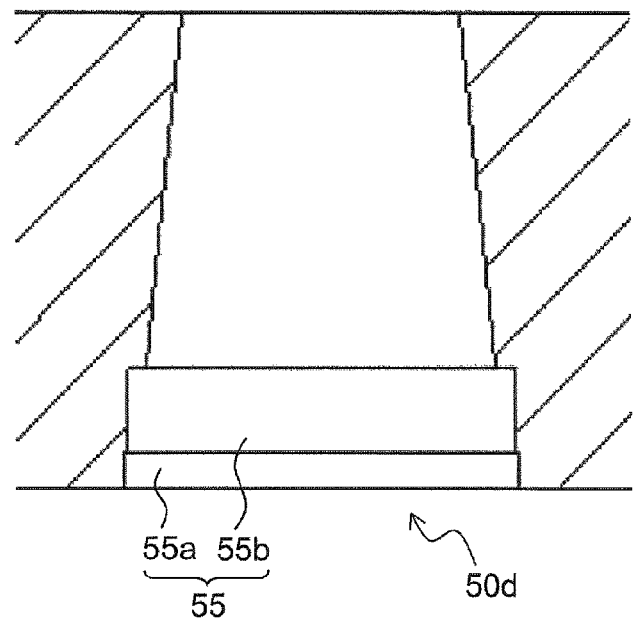
FIG. 6 is a sectional view of the light source insertion hole 50d formed in the side wall 48b.
Figure 7:
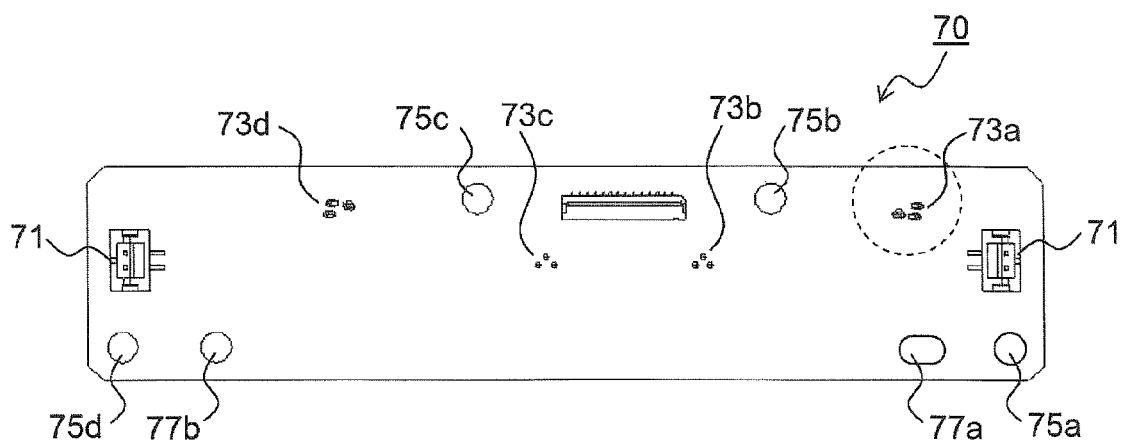
FIG. 7 is a plan view of a circuit board 70 fitted on the side wall 48b.
Figure 8:
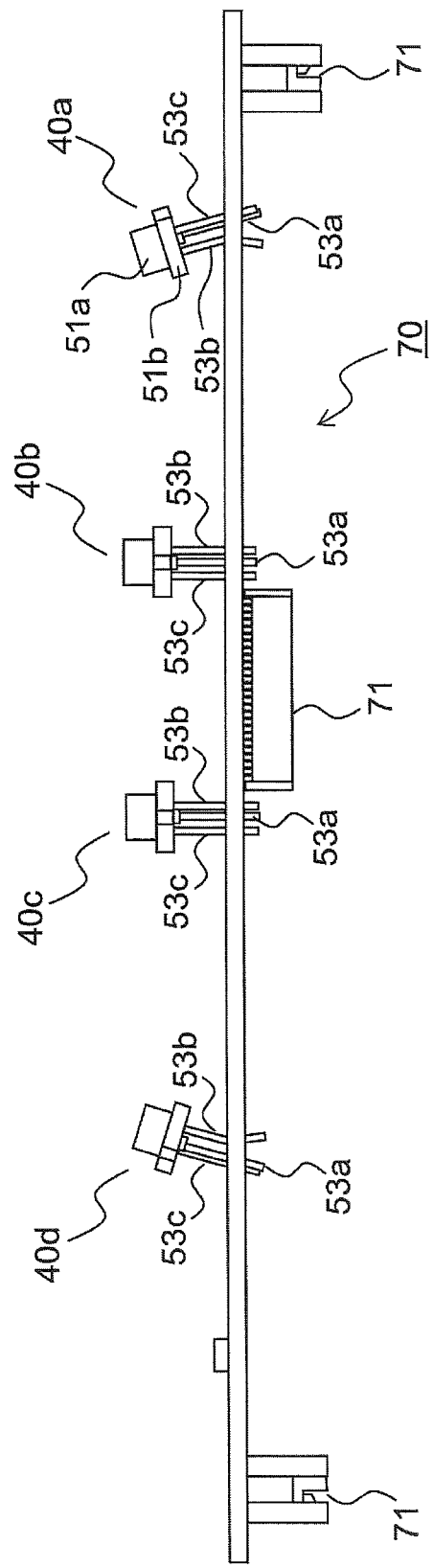
FIG. 8 is a side view of the circuit board 70 having terminals 53a to 53c of the laser light sources 40a to 40d inserted therein.
Figure 9:
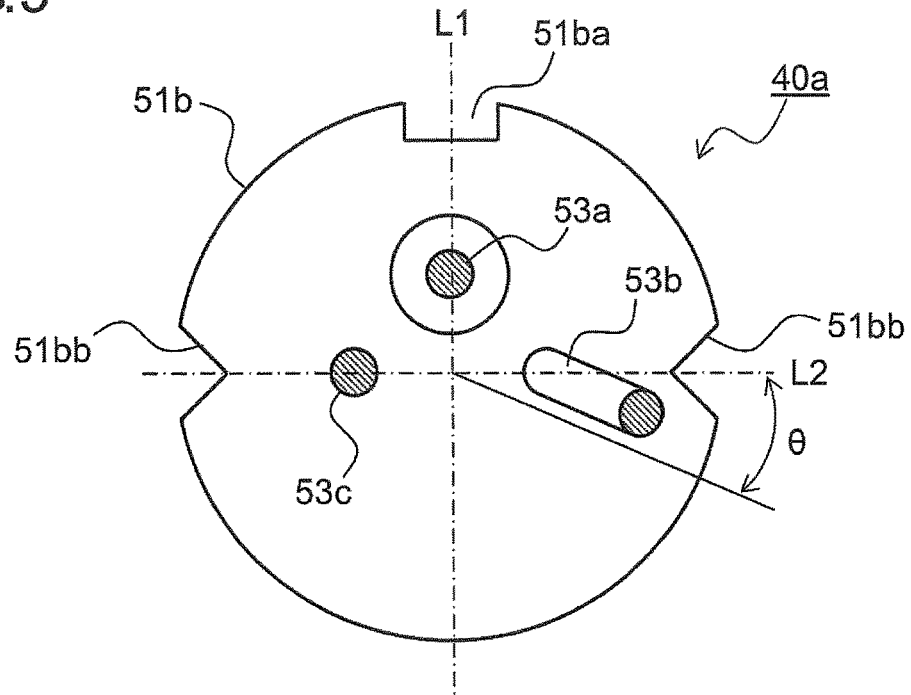
FIG. 9 is a plan view of the laser light source 40a as seen from the side at which it has the terminals 53a to 53c.

FIGS. 5 and 6 are respectively a perspective view and a sectional view of the light source insertion hole 50d formed in the side wall 48b. FIG. 7 is a plan view of the circuit board 70 fitted on the side wall 48b. FIG. 8 is a side view of the circuit board 70 having terminals 53 of the laser light sources 40a to 40d inserted in it. FIG. 9 is a plan view of the laser light source 40a as seen from the side at which it has the terminals 53a to 53c. Although the structure of the light source insertion hole 50d alone is illustrated in FIGS. 5 and 6, the light source insertion holes 50a to 50c have a similar structure. The laser light source 40d has the same structure as that of the laser light source 40a; the laser light sources 40b and 40c have the same structure as the laser light source 40a, except that, in these, the terminal 53b is not subjected to forming.

As shown in FIG. 5, the light source insertion holes 50a to 50d each have a press-in portion 55, which has a two-stage structure in which a large diameter portion 55a having a larger diameter than a flange 51b (see FIG. 8) of the laser light sources 40a to 40d and a small diameter portion 55b having a smaller diameter than the flange 51b are formed in this order from the outer side of the side wall 48b. At one place on the open rim of the press-in portion 55, a convexity 56 is formed that engages with a concavity 51ba (see FIG. 9) formed in the circumferential surface of the flange 51b to determine the position of the laser light sources 40a to 40d in their circumferential direction.

As shown in FIGS. 8 and 9, the laser light sources 40a to 40d are each composed of a main body 51a in the shape of a cylinder from which a laser light beam is emitted, a flange 51b that protrudes in the shape of a brim from the circumferential surface of the main body 51a, and three terminals 53a to 53c that protrude substantially perpendicularly from the bottom surface of the flange 51b. At one place on the circumferential rim of the flange 51b, there is formed a first concavity 51ba in a rectangular shape. At positions each 45° apart from the first concavity 51ba on opposite sides thereof, there are formed second concavities 51bb in a triangular shape.

As shown in FIG. 9, in the two outer laser light sources 40a (first laser light source) and 40d (second laser light source), one (the terminal 53b) of the three terminals 53a to 53c has been subjected to a forming (bending) process. The laser light sources 40a to 40d are in a reference position when they are arranged as shown in FIG. 9, where the first concavity 51ba points upward in the vertical direction (the direction of straight line L1) and the second concavities 51bb point in the horizontal direction (the direction of straight line L2). In the laser light sources 40a and 40d, due to a restriction of a jig with which the terminal 53b is subjected to forming, the terminal 53b has been subjected to forming in a direction inclined by an angle θ (here 23°) with respect to the horizontal direction.

To the side wall 48b, the circuit board 70 that controls the output of the four laser light sources 40a to 40d is fixed to face the outer side of the side wall 48b. The circuit board 70 controls the output of the four laser light sources 40a to 40d, and as shown in FIG. 7, on the circuit board 70, electronic components 71 such as IC chips, resistors, and capacitors are mounted.

As shown in FIG. 7, in the circuit board 70, there are formed terminal insertion holes 73a to 73d in which the terminals 53a to 53c of the four laser light sources 40a to 40d are inserted and fixed, four screw insertion holes 75a to 75b in which screws are inserted, and two boss insertion holes 77a and 77b with which the positioning bosses 59a and 59b on the side wall 48b of the housing 48 are engaged. The boss insertion hole 77a in which the positioning boss 59a is inserted is an oblong hole that is elongate in the horizontal direction; the boss insertion hole 77b in which the positioning boss 59b is inserted is a circular hole.

The terminal insertion holes 73b and 73c, in which the terminals 53a to 53c of the two inner laser light sources 40b and 40c are inserted, are formed in the shape of a circular hole having a slightly larger diameter than the terminals 53a to 53c. On the other hand, the terminal insertion holes 73a and 73d, in which the terminals 53a to 53c of the two outer laser light sources 40a and 40d are inserted, are formed in the shape of an oblong hole (see FIG. 19) to allow easy insertion of the terminals 53a to 53c of the laser light sources 40a and 40d, which obliquely protrude from the flange 51b.

Around the terminal insertion holes 73a to 73d in the circuit board 70, there is formed a layer of copper (unillustrated) referred to as a land so as to permit soldering from the direction (from front with respect to the plane of FIG. 7) opposite to the inserting direction of the terminals 53a to 53c. This copper layer may be formed by etching copper foil or by plating.

Figure 10:
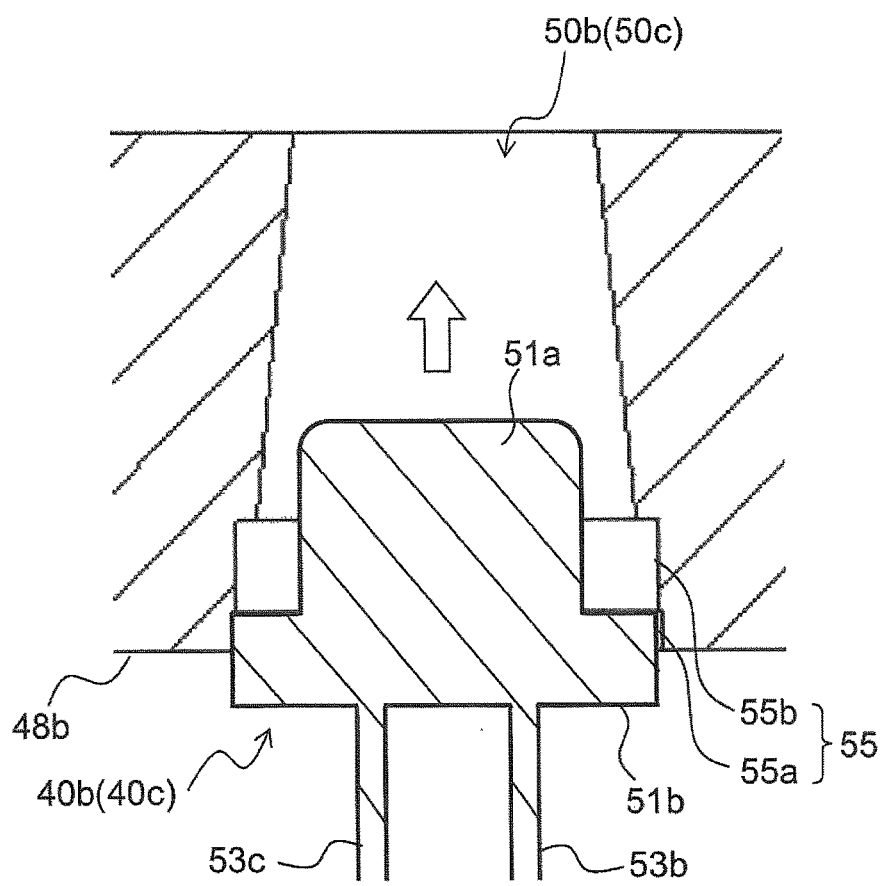
FIG. 10 is a sectional view showing a state where a flange 51b of the laser light source 40b (40c) is held in a counterbored part of a press-in portion 55 in a light source insertion hole 50b (50c)
Figure 11:
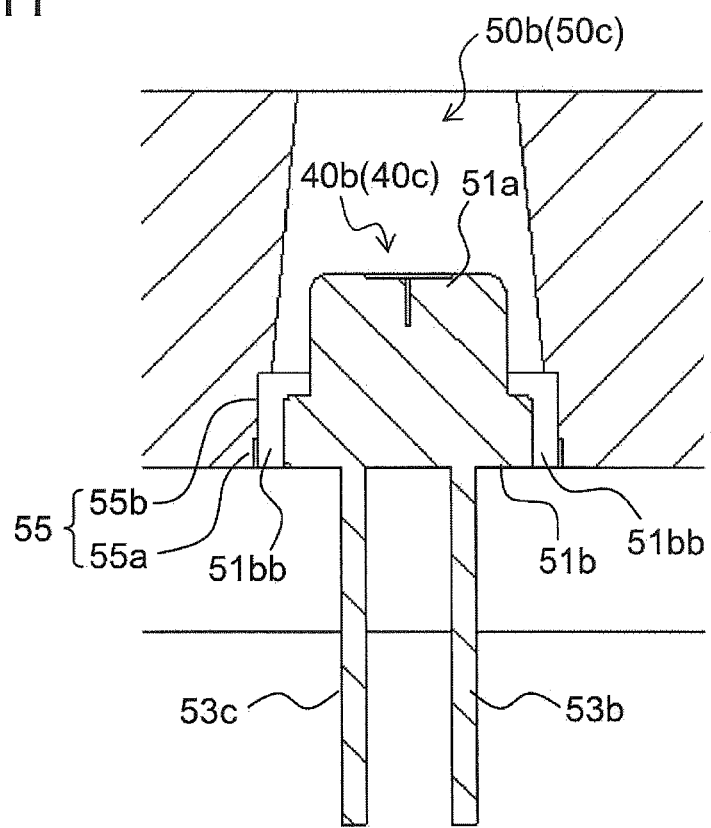
FIG. 11 is a sectional view showing a state where the laser light source 40b (40c) is pressed and fixed in the press-in portion 55 of the light source insertion hole 50b (50c)
Figure 12:
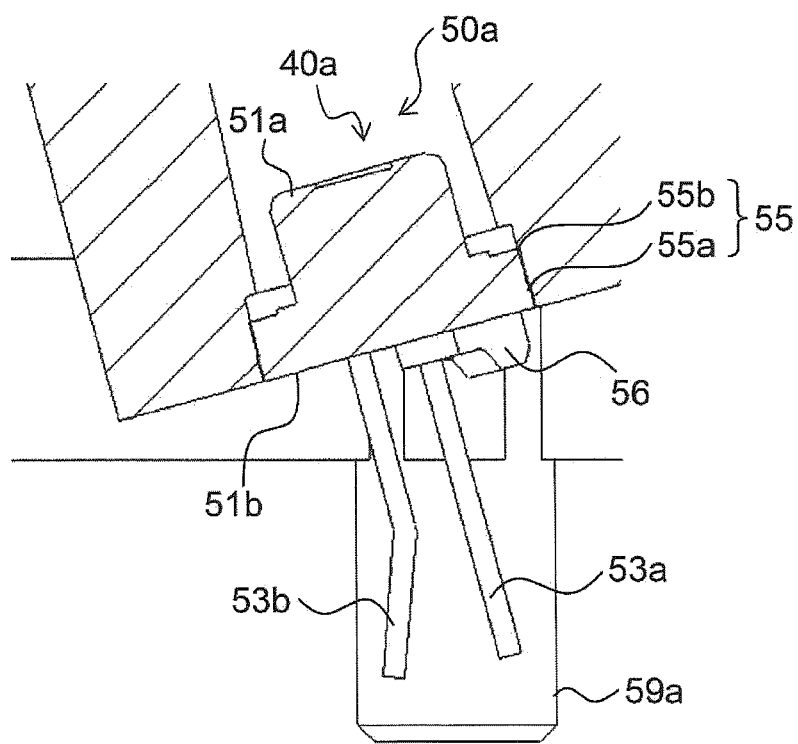
Figure 13:
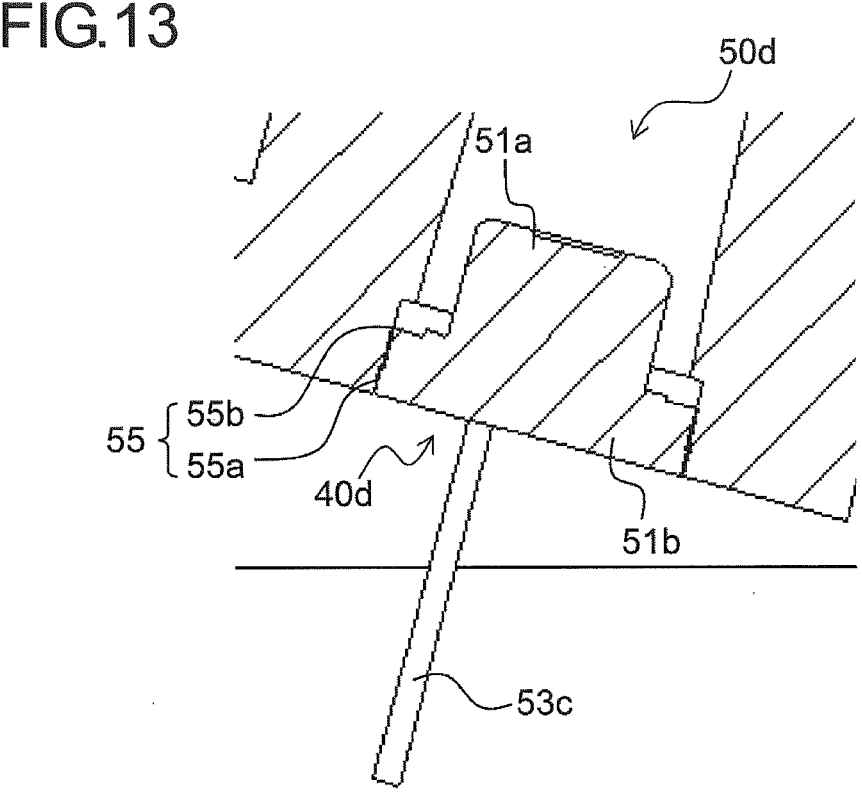
FIG. 13 is a sectional view showing a state where the laser light source 40d is pressed and fixed in a press-in portion 55 of the light source insertion hole 50d.
Figure 14:
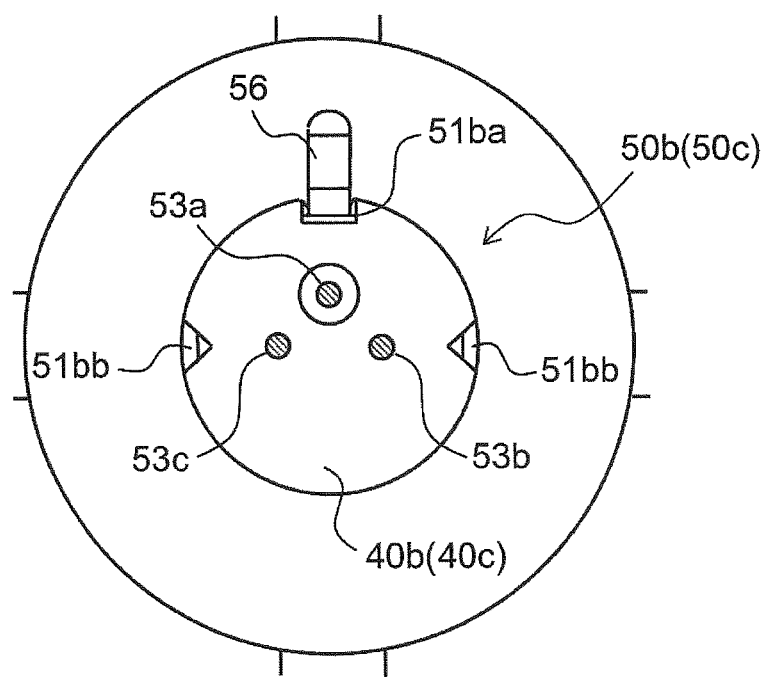
FIG. 14 is a plan view showing a state where the laser light source 40b (40c) is pressed and fixed in the press-in portion 55 of the light source insertion hole 50b (50c)
Figure 15:
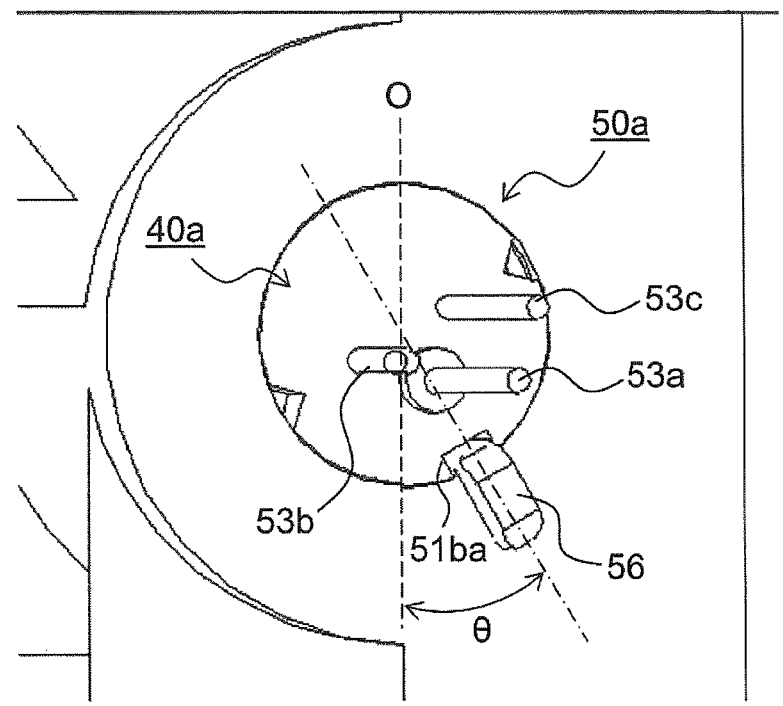
Figure 16:
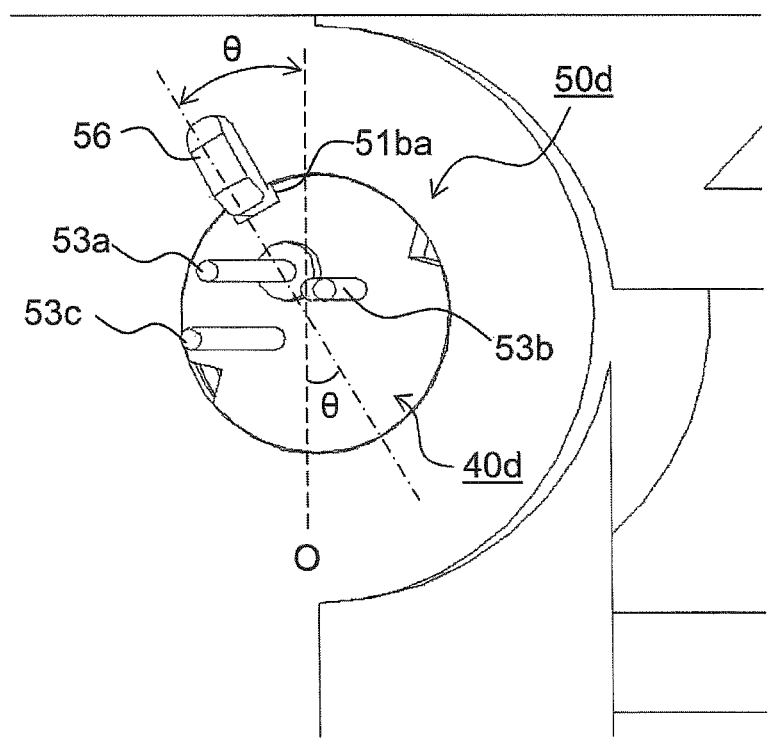
FIG. 16 is a perspective view showing a state where the laser light source 40d is pressed and fixed in the press-in portion 55 of the light source insertion hole 50d.
Figure 17:
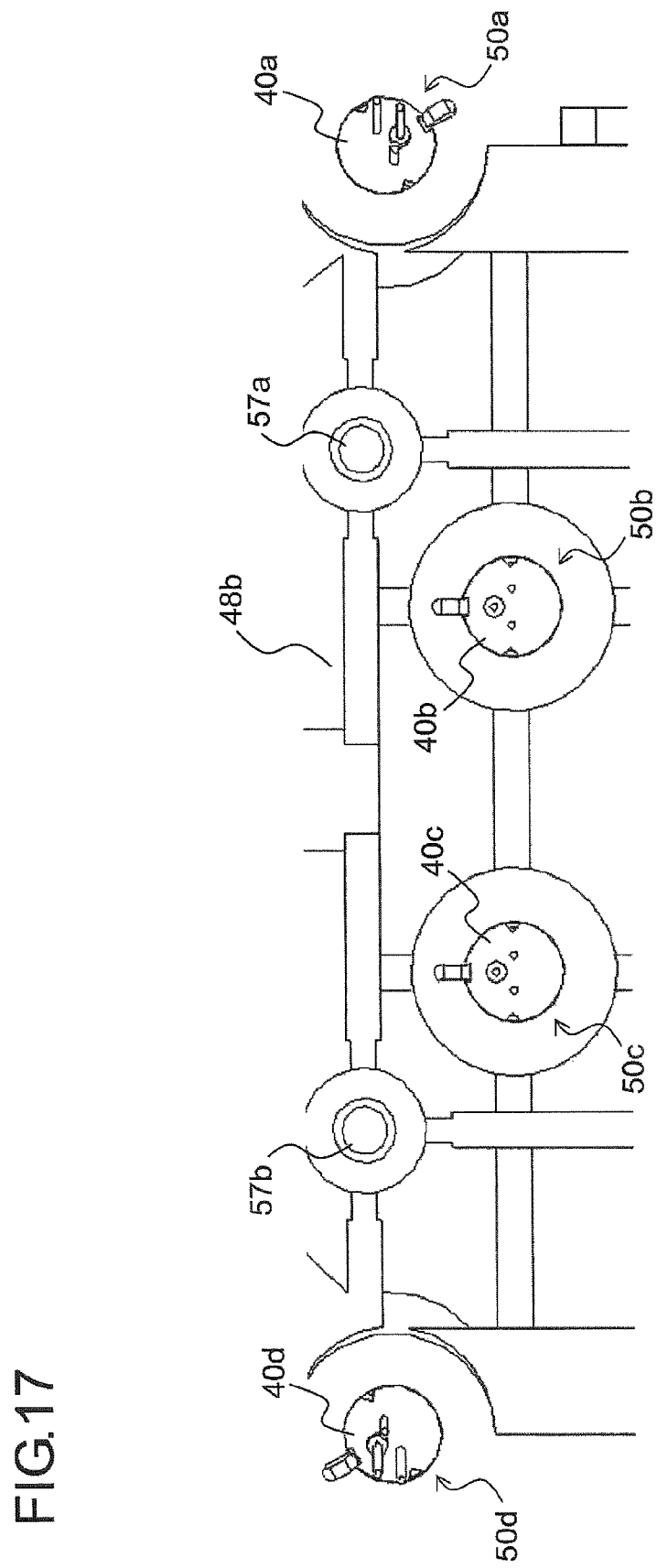
FIG. 17 is a front view showing a state where the laser light sources 40a to 40d are pressed and fixed in the light source insertion holes 50a to 50d.
Figure 18:
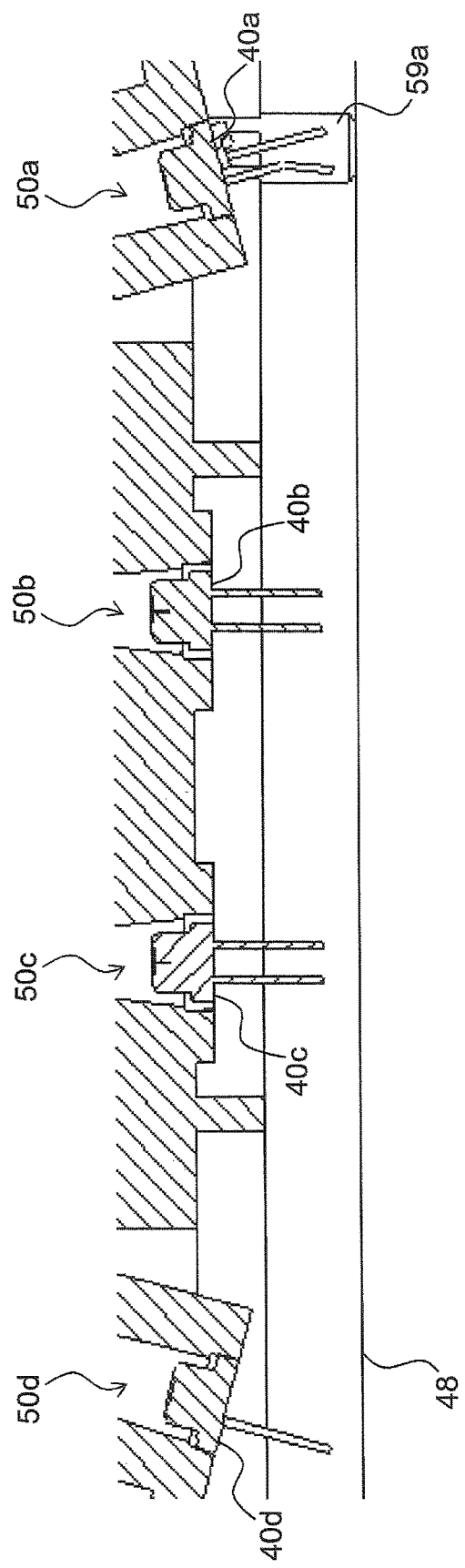
FIG. 18 is a sectional view showing a state where the laser light sources 40a to 40d are pressed and fixed in the light source insertion holes 50a to 50d.

Now, how the laser light sources 40a to 40d and the circuit board 70 are fitted to the housing 48 will be described. FIG. 10 is a sectional view showing a state where the flange 51b of the laser light source 40b (40c) is held in a counter-bored part of the press-in portion 55 in the light source insertion hole 50b (50c). FIGS. 11 to 13 are sectional views showing states where the laser light sources 40b (40c), 40a, and 40d are pressed and fixed in the press-in portions 55 of the light source insertion holes 50b (50c), 50a, and 50d respectively. FIG. 14 is a plan view showing a state where the laser light source 40b (40c) is pressed and fixed in the press-in portion 55 of the light source insertion hole 50b (50c). FIGS. 15 and 16 are perspective views showing states where the laser light sources 40a and 40d are pressed and fixed in the press-in portions 55 of the light source insertion holes 50a and 50d respectively. FIGS. 17 and 18 are respectively a front view and a sectional view showing a state where the laser light sources 40a to 40d are pressed and fixed in the light source insertion holes 50a to 50d.

First, from the outer side of the side wall 48b of the housing 48, the four laser light sources 40a to 40d are pressed and fixed, with their terminals 53 pointing to the outer side of the side wall 48b, in the four light source insertion holes 50a to 50d respectively. Specifically, as shown in FIG. 10, with the concavity 51ba of the flange 51b positioned at the convexity 56 of the press-in portion 55, the flange 51b of each of the laser light sources 40b and 40c is inserted in the press-in portion 55. Here, the small diameter portion 55b has a smaller diameter than the flange 51b, and thus the flange 51b can be held in a counter-bored part between the large diameter portion 55a and the small diameter portion 55b. This permits the flange 51b to be held parallel to the side wall 48b. Likewise, the laser light sources 40a and 40d are inserted in the press-in portions 55 of the light source insertion holes 50a and 50d, and the flanges 51b are each held in a counter-bored part between the large diameter portion 55a and the small diameter portion 55b.

In this state, a force is applied to the laser light sources 40a and 40d so that, as shown in FIGS. 11 to 18, while the flange 51b and the side wall 48b are held parallel to each other, the flange 51b can be pressed and fixed in the small diameter portion 55b. That is, placing the flange 51b temporarily in a counter-bored part between the large diameter portion 55a and the small diameter portion 55b of the press-in portion 55 permits the flange 51b to be pressed in while the side wall 48b and the flange 51b are held parallel to each other. FIG. 11 shows a section of the flange 51b cutting through the second concavity 51bb.

As shown in FIGS. 17 and 18, the four laser light sources 40a to 40d are pressed and fixed in the light source insertion holes 50a to 50d from the outer side of the housing 48 such that the terminals 53a to 53c protrude outward through the side wall 48b. Of the laser light sources 40a to 40d, the two inner laser light sources 40b and 40c are arranged at substantially the same height, and the two outer laser light sources 40a and 40d are arranged at substantially the same height, at a higher position than the laser light sources 40b and 40c.

The two outer laser light sources 40a and 40d each have a predetermined angle (inclination) with respect to the circuit board 70 relative to perpendicular line O (see FIGS. 15 and 16) as an axis of rotation, and the angles of the laser light source 40d and the laser light source 40a with respect to the circuit board 70 are in symmetry. In this embodiment, used as the laser light source 40d (second laser light source) inserted in the light source insertion hole 50d is one obtained by rotating through 180° the laser light source 40a (first laser light source) inserted in the light source insertion hole 50a.

Then, as shown in FIG. 8, the circuit board 70 is fitted to the side wall 48b from its outer side. As described above, owing to the flange 51b being held in a counter-bored part between the large diameter portion 55a and the small diameter portion 55b, the laser light sources 40a to 40d can be prevented from being inclined when pressed in. This reduces variations in the protruding positions of the terminals 53a to 53c. As a result, it is possible to smoothly insert the terminals 53a to 53c in the terminal insertion holes 73a to 73d of the circuit board 70.

As shown in FIG. 15, the laser light source 40a is inserted in the light source insertion hole 50a such that the first concavity 51ba points downward, and at the light source insertion hole 50a, the convexity 56 is formed at a position deviated from perpendicular line O by the angle θ (23°) in the counter-clockwise direction. As shown in FIG. 9, the terminal 53b has been subjected to forming in a direction inclined by an angle θ (23°) with respect to the horizontal direction. Thus, when the first concavity 51ba is fitted on the convexity 56, the laser light source 40a is fitted to the side wall 48b such that a tip end part of the terminal 53b point in the horizontal direction (the leftward direction in FIG. 15).

On the other hand, the terminals 53a and 53c, which has not been subjected to forming, protrude perpendicularly from the flange 51b, and thus, irrespective of the rotation of the flange 51b, the terminals 53a and 53c protrude with an inclination equal to the inclination angle of the laser light source 40a with respect to the side wall 48b in the horizontal direction (the rightward direction in FIG. 15). Thus, all of the three terminals 53a to 53c of the laser light source 40a protrude with their tip end parts pointing in the horizontal direction.

Likewise, as shown in FIG. 16, the laser light source 40d is inserted in the light source insertion hole 50d such that the first concavity 51ba points upward, and at the light source insertion hole 50d, the convexity 56 is formed at a position deviated from perpendicular line O by the angle θ (23°) in the counter-clockwise direction. Thus, the laser light source 40d achieves a state as if the laser light source 40a were rotated through 180° and fitted on, with the result that the three terminals 53a to 53c of the laser light source 40d also protrude with their tip end parts pointing in the horizontal direction.

Figure 19:
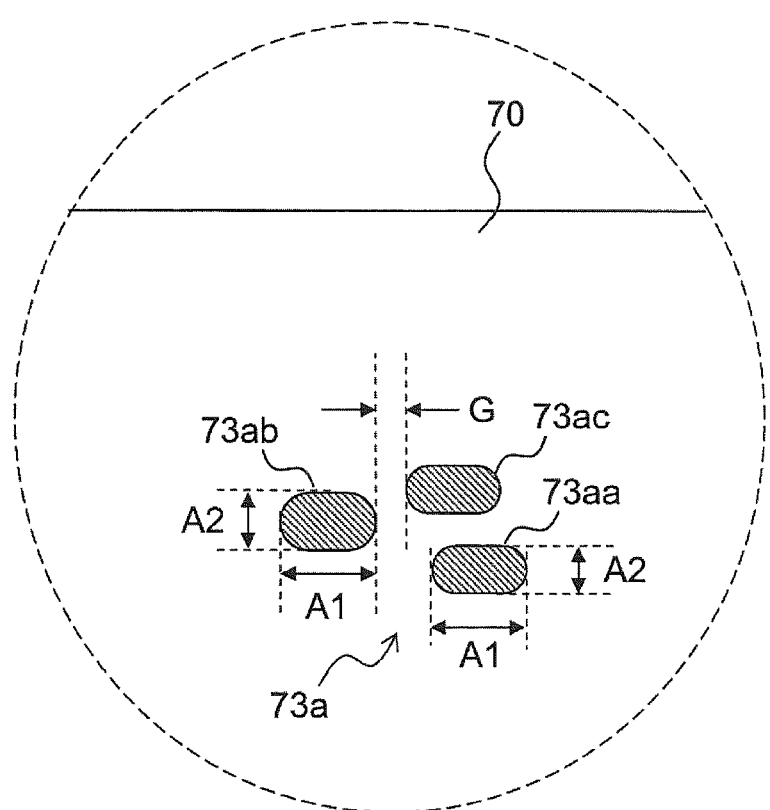
FIG. 19 is an enlarged view of a terminal insertion hole 73a formed in the circuit board 70.

FIG. 19 is an enlarged view of the terminal insertion hole 73a (inside the broken-line in FIG. 7) formed in the circuit board 70. As shown in FIG. 19, the terminal insertion hole 73a has a first insertion hole 73aa in which the terminal 53a is inserted, a second insertion hole 73ab in which the terminal 53b is inserted, and a third insertion hole 73ac in which the terminal 53c is inserted. All of the first to third insertion holes 73aa to 73ac are formed in the shape of an oblong hole that is elongate in the same direction (horizontal direction).

All of the first to third insertion holes 73aa to 73ac have the same dimension A1 (about 1.6 mm) in their longitudinal direction. While the first and third insertion holes 73aa and 73ac have the same dimension A2 (about 0.8 mm) in the direction orthogonal to their longitudinal direction, with consideration given to variations in the forming of the terminal 53b, the second insertion hole 73ab is given a slightly larger dimension (about 1 mm) than the first and third insertion holes 73aa and 73ac. Here, no description will be given of the structure of the terminal insertion hole 73d in which the terminals 53a to 53d of the laser light source 40d are inserted, since the terminal insertion hole 73d is one obtained by rotating through 180° the terminal insertion hole 73a (the first to third insertion holes 73aa to 73ac) shown in FIG. 19.

As described above, all of the three terminals 53a to 53c of the laser light sources 40a and 40d protrude with their tip end parts pointing in the horizontal direction, and thus the first to third insertion holes 73aa to 73ac that constitute the terminal insertion holes 73a and 73d are also formed in the shape of an oblong hole that is elongate in the horizontal direction. This makes it easy to position the terminals 53a to 53c at the first to third insertion holes 73aa to 73ac.

As the result of the terminal 53b being subjected to forming in a direction away from the terminals 53a and 53c, the second insertion hole 73ab in which the terminal 53b is inserted can be located away from the first and third insertion holes 73aa and 73ac. Specifically, as compared with a case where the terminal 53b is not subjected to forming, a gap G (about 0.45 mm) between the second insertion hole 73*ab* and the third insertion hole 73*ac* can be secured, and this facilitates the formation of the copper layer (land) on the circuit board 70.

Then, after the terminals 53*a* to 53*c* are inserted in the terminal insertion holes 73*a* to 73*d*, the circuit board 70 is moved further toward the side wall 48*b* so as to insert the two positioning bosses 59*a* and 59*b* (see FIG. 4) in the boss insertion holes 77*a* and 77*b* in the circuit board 70. In this way, the circuit board 70 is positioned in the planar direction (the direction parallel to the side wall 48*b*). The circuit board 70 is positioned in the inserting direction by making contact with the circumferential rims of the light source insertion holes 50*a* to 50*d* and the screw holes 57*a* to 57*d*.

Then, screws are inserted through the screw insertion holes 75*a* to 75*d* (see FIG. 7) of the circuit board 70, and are threaded in the screw holes 57*a* to 57*d* (see FIG. 4) of the side wall 48*b* so that the circuit board 70 is fixed to the side wall 48*b*. Then, the terminals 53*a* to 53*d* of the laser light sources 40*a* to 40*d* are soldered on the copper layer on the circuit board 70, and thereby the laser light sources 40*a* to 40*d* are electrically connected to the circuit board 70. In the manner described above, the laser light sources 40*a* to 40*d* and the circuit board 70 are fixed to the housing 48.

In this embodiment, of the three terminals 53*a* to 53*c* of the laser light sources 40*a* and 40*d* having an angle with respect to the circuit board 70, the terminal 53*b* alone is subjected to forming in a direction away from the terminals 53*a* and 53*c*. This helps minimize the number of terminals (one terminal) which have to be subjected to forming, and thus it is possible to reduce the risk of electrostatic breakdown, cracks, wire bonding breakage, etc., in the laser light sources 40*a* and 40*d*, which are prone to occur during the forming. Subjecting the terminal 53*b* to forming in a direction away from the terminals 53*a* and 53*c* helps secure a sufficient gap G to form the copper layer (land) between the first and third insertion holes 73*aa* and 73*ac* and the second insertion hole 73*ab*, which together constitute the terminal insertion holes 73*a* and 73*d*.

Used as the laser light source 40*d* (second laser light source) inserted in the light source insertion hole 50*d* is one obtained by rotating through 180° the laser light source 40*a* (first laser light source) inserted in the light source insertion hole 50*a*. This helps reduce the number of components, and thus helps improve assembly efficiency.

The flanges 51*b* of the laser light sources 40*a* to 40*d* are each temporarily held in a counter-bored part between the large diameter portion 55*a* and the small diameter portion 55*b*, and are then pressed in the small diameter portion 55*b* so that the flanges 51*b* can be pressed in the light source insertion holes 50*a* to 50*d* while being held parallel to the side wall 48*b*. Thus, it is possible to quickly and accurately fit the laser light sources 40*a* to 40*d* to the housing 48.

The terminals 53*b* of the laser light sources 40*a* and 40*d*, which have been subjected to forming, are inserted in the light source insertion holes 50*a* and 50*d* with their tip end parts pointing in the horizontal direction, and thereby all of the terminals 53*a* to 53*c* of the laser light sources 40*a* and 40*d* protrude in the horizontal direction. This facilitates the positioning with respect to the first to third insertion holes 73*aa* to 73*ac* formed in the circuit board 70.

The embodiments described above are in no way meant to limit the present invention, which thus allows for many modifications and variations within the spirit of the present invention. For example, although the above-described embodiments deal with an optical scanning device 4 in which laser light beams D1 to D4 are emitted through the top face of a housing 48 to illuminate photosensitive drums 1*a* to 1*d* arranged over the housing 48, the photosensitive drums 1*a* to 1*d* may be arranged under the optical scanning device 4, and the laser light beams D1 to D4 may be emitted through the bottom face of the housing 48.

Although the above-described embodiments deal with an optical scanning device 4 in which a polygon mirror 45 is arranged substantially at the center of a housing 48 such that laser light beams D1 and D2 and laser light beams D3 and D4 are deflected in opposite directions, the polygon mirror 45 may be arranged at one end of the housing 48 such that the laser light beams D1 to D4 are, while being deflected in the same direction, separated in the sub-scanning direction.

INDUSTRIAL APPLICABILITY

The present invention is applicable to optical scanning devices that scans with laser light to write and form an electrostatic latent image and that are incorporated in image forming apparatuses such as printers, copiers, facsimile machines, etc. Based on the present invention, it is possible to provide an optical scanning device that can minimize the number of places where an LD (laser diode) lead has to be subjected to forming and that can obtain simple assembly owing to the reduced number of components, and to provide an image forming apparatus incorporating such an optical scanning device.

The invention claimed is:
1. An optical scanning device comprising:
   a housing;
   a plurality of laser light sources fitted to a side wall of the housing such that three terminals of the laser light sources protrude outward; and
   a circuit board arranged opposite an outer face of the side wall of the housing, the circuit board having formed therein insertion holes through which the terminals of the laser light sources are inserted,
   the optical scanning device scanning a scanned surface with laser light emitted from the laser light sources, wherein
   the laser light sources include a first laser light source which has a predetermined angle with respect to the circuit board, and a second laser light source which has such an angle with respect to the circuit board as to be in symmetry with the first laser light source,
   the first laser light source has, of the three terminals thereof, only one terminal subjected to bending in a direction away from the other two terminals, and
   the second laser light source is a laser light source having a same structure as the first laser light source but arranged rotated through 180° therefrom.
2. The optical scanning device of claim 1, wherein
   the first and second laser light sources each include a main body in a shape of a cylinder from which laser light is emitted, and a flange protruding in a shape of a brim from a circumferential surface of the main body, and
   in the side wall of the housing, light source insertion holes are formed, each of which has a press-in portion, which has a two-stage structure in which a large diameter portion having a larger diameter than the flange and a small diameter portion having a smaller diameter than the flange are formed in this order from an outer side of the side wall.
3. The optical scanning device of claim 1, wherein
   the first and second laser light sources are fitted to the side wall of the housing such that tip end parts of the three terminals thereof all point in a horizontal direction.

4. The optical scanning device of claim 3, wherein
the circuit board has formed therein terminal insertion holes which have first, second, and third insertion holes in which the three terminals of the first and second laser light sources are inserted, and
the first, second, and third insertion holes are all formed in a shape of an oblong hole that is elongate in a horizontal direction.

5. The optical scanning device of claim 4, wherein
of the first, second, and third insertion holes, the second insertion hole, in which the terminal that has been subjected to bending is inserted, has a larger dimension than the first and third insertion holes in a direction orthogonal to a longitudinal direction thereof.

6. An image forming apparatus comprising the optical scanning device of claim 1.

* * * * *